United States Patent [19]

Hamelin

[11] Patent Number: 5,222,784
[45] Date of Patent: Jun. 29, 1993

[54] ELECTRIC HEAD-REST, PARTICULARLY FOR VEHICLE SEATS

[75] Inventor: Bruno Hamelin, Courcouronnes, France

[73] Assignee: Bertrand Faure Automobile, Cedex, France

[21] Appl. No.: 736,298

[22] Filed: Jul. 29, 1991

[30] Foreign Application Priority Data

Jul. 30, 1990 [FR] France .................. 90 09689

[51] Int. Cl.⁵ .................................................. A47C 7/36
[52] U.S. Cl. .................................... 297/408; 297/410
[58] Field of Search .............. 297/391, 397, 408, 410, 297/403

[56] References Cited

U.S. PATENT DOCUMENTS

| | | | |
|---|---|---|---|
| 3,572,834 | 3/1971 | Herzer et al. | 297/397 X |
| 4,222,608 | 9/1980 | Maeda | 297/391 X |
| 4,466,662 | 8/1984 | McDonald et al. | 297/391 X |
| 4,976,493 | 12/1990 | Frankila | 297/410 |

FOREIGN PATENT DOCUMENTS

| | | | |
|---|---|---|---|
| 3519351 | 12/1986 | Fed. Rep. of Germany | 297/410 |
| 3545142 | 6/1987 | Fed. Rep. of Germany | 297/391 |

Primary Examiner—Kenneth J. Dorner
Assistant Examiner—Milton Nelson, Jr.
Attorney, Agent, or Firm—Larson and Taylor

[57] ABSTRACT

This head-rest is essentially characterized in that the electric motors for actuating in height and in inclination as well as the positioning transmission chains which are respectively associated therewith, are housed in a casing itself mounted inside the head-rest. The electrical connections to these motors end at a connector adapted to be plugged into a connection base fixed permanently to the upper portion of the back-rest of the seat.

8 Claims, 1 Drawing Sheet

U.S. Patent
June 29, 1993
5,222,784
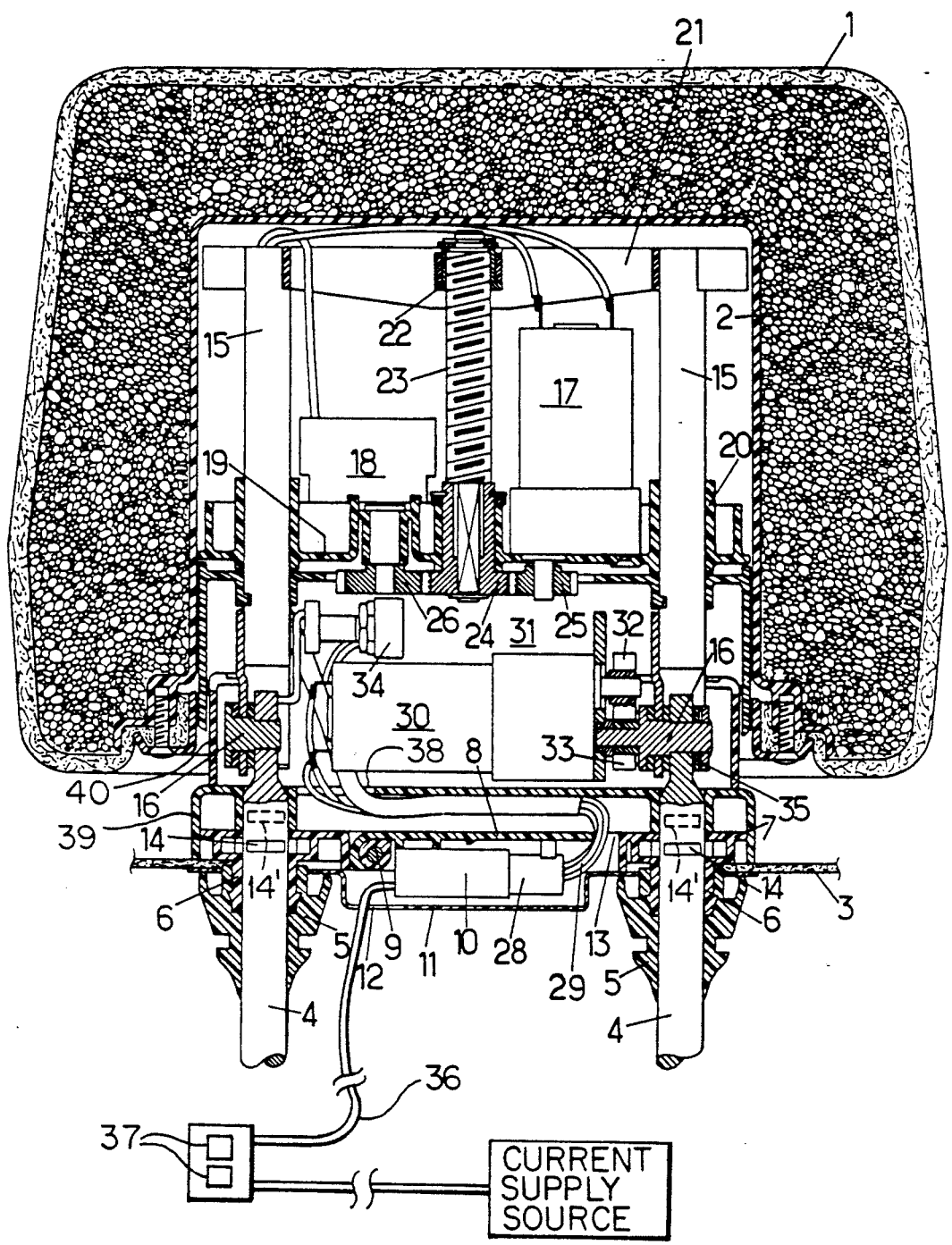

ELECTRIC HEAD-REST, PARTICULARLY FOR VEHICLE SEATS

BACKGROUND OF THE INVENTION

The present invention relates to an electric head-rest, particularly for vehicle seats, comprising removeable fastening means, of the standard separation sliding pin type, enabling its mounting on the upper portion of the back-rest of the seat, and associated with at least one electric motor connected on the one hand mechanically to a positioning transmission chain for a cushion holder housing and on the other hand, by an electric connection to control members connected to a current supply associated with said seat, within reach of the hands of its occupant.

Such a head-rest could only include a single electric motor, for example for actuating its position in height; it could however comprise a second motor, for actuating its tilt, by pivoting around a horizontal axis. By motor must be understood, in principle, a motor-potentiometer, the axle of which is coupled to the shaft of the motor so that the voltage available on its slider may provide a memory of the positioning in height or in inclination.

A head-rest of this type (DE-A-3 805 957), is already known of which the motor and the associated members (mechanical transmission and the like) are housed in the back-rest of the seat, the head-rest itself being only constituted by a cushion, provided with its two pins for fitting into the back-rest. The latter hence is heavily equipped, which systematically increases the price of the vehicles and renders the establishment of a system of options more difficult. The option "vehicles with or without electric head-rest" is converted in fact into an option "vehicles with or without specially equipped seat back-rest" (for electrical actuation of the positioning of the head-rest).

It is an object of the present invention to overcome this type of drawback and for this purpose, the head-rest of the general type defined at the beginning will be, in accordance with the present invention, essentially characterized in that each electric motor and the positioning transmission chain which is associated therewith are lodged inside said housing, and wherein said electrical connection ends in a connector adapted to be plugged onto a connection base permanently fixed to said upper portion of the back-rest, the latter only containing the portion of said electrical connection which extends between said base and said actuating members.

Thus, to the contrary of what has been encountered in the prior art mentioned above, it is now the head-rest which comprises the maximum number of members, namely the essential members and the back-rest of the seat, the minimum, namely only the electrical connections indispensable between the connection base and the actuating members. In this way a practically autonomous integral head-rest is obtained, constituting in itself alone an optional module. It is even possible, due to the invention, to contemplate mounting on all vehicules seats of which the back-rest is pre-equipped with these connection bases and electrical connections, their price then only being very little increased with respect to that of ordinary seats. Such back-rests will also enable, by the choice of the customer, to mount thereon either a conventional head-rest, with manual adjustments, or a head-rest in accordance with the invention with electrical adjustments.

From the point of view of construction, a head-rest according to the invention could also be distinguished by the following features of mounting and arrangements: it comprises, slideably mounted on two guide rods fast to said pins, a support base adapted to be fixed in said housing and supporting a first electrical motor for actuating the position in height of said base, and as the case may require its potentiometer.

Said positioning transmission chain comprises a screw-nut system and gears, the shaft of said first motor extending vertically.

This head-rest can also comprise, beneath and fast to said support base, a housing for a second electric motor, of horizontal axis, connected mechanically to said guide rods, which are respectively pivoted on the said pins along a virtual horizontal axis, for controlling the tilt of these rods with respect to said pins.

Advantageously also, the positioning transmission chain between said second electric motor and said rods is of the gear type and is arranged to cause said housing and its contents to pivot with respect to said pins.

Other details and advantages of a head-rest according to the invention will appear on reading the description which is given here below by way of purely non-limiting example, with reference to the single figure of the accompanying drawing.

BRIEF DESCRIPTION OF THE DRAWING

The single FIGURE is an elevational front sectional view of the electric head-rest of the present invention taken through the vertical plane containing the conventional mounting pins of the head-rest.

DESCRIPTION OF A PREFERRED EMBODIMENT

In this FIGURE, the cushions of the head-rest have been referenced 1 and the housing which supports them at 2. This head-rest may be mounted on the upper portion of a seat back-rest 3, for example an automobile vehicle, by means of two conventional pins 4, of standard separation, constituting at the same time, for the head-rest, a rigid support structure and a reference for its positioning in height and in inclination. These pins 4 are engaged in bushings fixed to the back-rest, referenced as 5 and in which are spring caught smaller bushings 6, produced by molding with a finishing plate 7, which encloses the covering fabric of the seat 3 between itself and the sides of a shaped plate 11, constituting a housing. This plate 7 comprises a closure trap 8 moveable around an axis 9 enabling access to a connection base 10 contained in said housing 11.

Thus, to render a head-rest operational according to the invention, it suffices to open the trap 8, to plug onto said connection base 10 a connector 28 connected by internal cabling 29 to the electrical member situated inside the head-rest, to close this trap up again and then to mount the head-rest normally on the top of the back-rest, by means of its pins 4, which are spring caught at the level of the plate 7 (see height pre-adjustment notches 14).

The back-rest of the seat proper thus has only to enclose cabling (36) to establish the electrical connection between the connection base 10 and the members 37 for actuating the inclination and the height of the head-rest, which will of course be arranged within reach of the hand of the occupant of the seat (for example on the side of the seat frame). It is to be noted that this inner cabling 36 of the back-rest passes through an aperture 12 of plate 11, whilst the cabling 29 starting from the aforesaid connector 28 to go to the internal motors will pass through an aperture 13 formed at the end of the trap 8 and through an aperture 38 in a bottom finishing member 39 of head-rest 1 which engages notches 14' and to which is securely attached an upper member 40

On the pins 4 are respectively pivoted guide rods 15 and these are pivoted around pivots referenced at 16.

The first electric motor reference 17, and serving for the raising and lowering of the head-rest, is, as the associated potentiometer 18, mounted on a support base 19 fastened to the housing 2 and adapted to slide by means of sleeves 20 on the aforesaid guide rods 15. These rods 15 are joined at their upper portion by a bracing yoke 21 into which is centrally fitted a nut 22 receiving a manipulating screw 23. At the lower end of this screw, which is fitted axially with respect to the support base 19, is fitted in rotation a pinion 24 in engagement on the one hand with a pinion 25 fixed to the output shaft of the motor 17, and on the other hand, with a pinion 26 fixed to the axle of the potentiometer 18.

Thus it is understood that when the rotation of the motor 17 is actuated, in one direction or the other, from the aforesaid actuating members, the rotation of the screw 23 in the fixed nut 22 causes the base of the support 19 to ascend or descend at will as well as the housing 2 with which it is fast. When the desired position is reached, the cursor of the potentiometer 18 is at a voltage representative of this position and which can be memorized; this will permit a given occupant of the seat to retrieve immediately the position which suits him best if the adjustment has in the interval been modified by another person.

It is well understood that the motor 17 and potentiometer 18 ascend and descend at the same time as their support base 19. When the base approaches its highest position, the motor and the potentiometer pass between the branches of the fixed yoke 21, sufficiently separated from one another for this purpose.

To cause the guide rod 15 to pivot, and hence the head-rest, with respect to the pins 4, a second electric motor 30, of horizontal axis, located in a housing 31 situated beneath the support base 19 is used; the body of the motor is fixed in rotation with respect to this housing 31 and hence with respect to the base 19 and to the housing 2 of the head-rest. On the output shaft of this second motor is fastened a planetary pinion 32 in engagement with a fixed pinion 33, fast to the corresponding fixed pivot 16.

Thus, when the rotation of this second motor 30 is actuated, in one direction or the other from the actuating members which have been considered above (comprising start-stop switches, inverters of the direction of rotation of the motors, etc.), the motor and its housing 31 pivot in the corresponding direction, around the axis of the pivots 16, which permits the head-rest to be given the desired tilt. The second motor 30 is associated also with a potentiometer, reference 34, which has the same memorization role as the preceding one.

It is to be noted finally that friction washers such as 35 are mounted on pivots 16, between corresponding flanges, to permit a slight rotation of the head-rest in case of impact and to avoid a deterioration of the pinions in engagement 32 and 33.

A head-rest according to the invention has the advantage of being completely interchangeable with the conventional unmotorized head-rests, this due to the standard separation of its pins 4 and to its particularly small bulk, quite comparable with that of conventional head-rests. It integrates the totality of the active members necessary for its operation, the seat having only to receive a cabling system and actuating members. This considerably facilitates the interchangeability of the head-rest.

Whatever embodiment of the head-rest according to the invention has been described with a double electrical control, it is of course understood that the invention will still preserve its interest in the case where only the control in height would be motorized, the control in tilt remaining manual. In this case, the mechanism of the adjustment of the tilt would remain totally masked by the casing of the housing 31, instead and in place of the motor 30 and of its potentiometer 34.

I claim:

1. An electrical head-rest, particularly for vehicle seats, comprising:
    a cushion holder housing;
    a removable fastening means extending from said cushion holder housing and having standard separation sliding pins for enabling mounting of said cushion holder housing on an upper portion of a back-rest of a seat;
    a respective guide rod secured to an associated said pin in said cushion holder housing;
    a support base in said cushion holder housing and to which is attached said cushion holder housing, said support base and hence said cushion holder housing being slidably mounted on said guide rods;
    a first electric motor mounted to said support base in said cushion holder housing, said first electric motor including a vertically extending shaft;
    a first transition chain in said cushion holder housing associated with said vertically extending shaft of said first electric motor for positioning said support base and hence said cushion holder housing relative to said sliding pins upon actuation of said first electric motor;
    a connection base fixed permanently to the upper portion of the back-rest;
    a first electrical connection for electrically connecting said at least one electric motor to said connection base, said electrical connection including a connector which is received by said connection base; and
    actuating members associated with the seat within reach of the hands of an occupant of the seat, said actuating members being electrically connected with said connection base by a second electrical connection whereby the upper portion of the back-rest only contains the second electrical connection which extends between said connection base and said actuating members.

2. An electrical head-rest as claimed in claim 1 wherein said first transition chain includes a screw-nut system and associated gears, a screw of said screw nut system extending vertically and being located centrally between said guide rods.

3. An electrical head-rest as claimed in claim 2 and further comprising a second electric motor having a horizontally extending shaft mounted in said cushion holder housing beneath said support base to said guide pins; a mounting means for pivotally mounting said guide rods to said pins for movement about a horizontal axis; and a second transition chain in said cushion holder housing associated with said horizontally extending shaft of said second electric motor for pivoting said guide rods and hence said cushion holder housing relative to said sliding pins upon actuation of said second electric motor.

4. An electrical head-rest as claimed in claim 3 wherein said first electric motor includes an elongate axis which extends vertically between said screw and one of said guide pins.

5. An electrical head-rest as claimed in claim 1 and further comprising a second electric motor having a horizontally extending shaft mounted in said cushion holder housing beneath said support base; a mounting means for pivotally mounting said guide rods to said pins for movement about a horizontal axis; and a second transition chain in said cushion holder housing associated with said horizontally extending shaft of said second electric motor for pivoting said guide rods and hence said cushion holder housing relative to said sliding pins upon actuation of said second electric motor.

6. An electrical head-rest as claimed in claim 5 wherein said second transition chain is a gearing type which is arranged to cause said second electric motor to pivot with said guide rods relative to said pins.

7. An electrical head-rest as claimed in claim 1 wherein each of said pins includes a notch therein adjacent said back-rest; and further including a seat housing located in said back-rest between said pins in which said connection base is located, and a finishing plate which covers said seat housing and which includes a closure trap which is movable to uncover said connection base, said finishing plate engaging said notches of said pins.

8. An electrical head-rest as claimed in claim 7 wherein each of said pins includes a second notch therein above a respective said first-mentioned notch; and wherein said removable fastening means includes a finishing member which is located above said finishing plate and which engages said second notches of said pins.

\* \* \* \* \*